(12) United States Patent
Huang et al.

(10) Patent No.: US 9,372,528 B2
(45) Date of Patent: **\*Jun. 21, 2016**

(54) UNIVERSAL SERIAL BUS (USB) 3.0 COMPATIBLE HOST WITH LOWER OPERATION POWER CONSUMPTION AND METHOD FOR REDUCING OPERATION POWER CONSUMPTION OF A USB 3.0 COMPATIBLE HOST

(75) Inventors: Chih-Hung Huang, Taipei (TW); Chien-Cheng Kuo, Taipei (TW); Shih-Min Hsu, Taipei (TW)

(73) Assignee: eEver Technology, Inc., Neihu Dist., Taipei (TW)

( \* ) Notice: Subject to any disclaimer, the term of this patent is extended or adjusted under 35 U.S.C. 154(b) by 266 days.

This patent is subject to a terminal disclaimer.

(21) Appl. No.: 13/481,861

(22) Filed: May 27, 2012

(65) Prior Publication Data

US 2012/0324261 A1 Dec. 20, 2012

(30) Foreign Application Priority Data

Jun. 16, 2011 (TW) .............................. 100121025 A
Jul. 29, 2011 (TW) .............................. 100126990 A

(51) Int. Cl.
*G06F 3/00* (2006.01)
*G06F 1/32* (2006.01)

(52) U.S. Cl.
CPC ............ *G06F 1/3287* (2013.01); *G06F 1/3253* (2013.01); *Y02B 60/1235* (2013.01); *Y02B 60/1282* (2013.01)

(58) Field of Classification Search
CPC . G06F 1/3203; G06F 1/3253; Y02B 60/1235; Y02B 60/1282
USPC ............... 710/110, 305, 60, 105, 11, 62, 300, 710/106, 15; 713/100, 323, 320, 501, 500, 713/2, 324, 300; 235/492; 439/660; 714/4.21
See application file for complete search history.

(56) References Cited

U.S. PATENT DOCUMENTS 7,702,825 B2 4/2010 Howard
7,788,428 B2 \* 8/2010 Melin .............................. 710/62

(Continued)

FOREIGN PATENT DOCUMENTS

TW 200712899 4/2007
TW 201007436 2/2010

(Continued)

OTHER PUBLICATIONS

Shir-Kuan Lin, "Quick introductory study on USB system-on-chip", http://web.it.nctu.edu.tw/~sklin/etech/fastusb2.pdf, p. 1, 5-6, May 2002.

*Primary Examiner* — Aurel Prifti
(74) *Attorney, Agent, or Firm* — Winston Hsu; Scott Margo

(57) ABSTRACT

A USB 3.0 host with low power consumption includes a super speed circuit, a non-super speed circuit, and a control module. The super speed circuit is used for transmitting data at a first transmission speed. A default state of the super speed circuit is turning-off. The non-super speed circuit is used for transmitting data at a second transmission speed, a third transmission speed, or a fourth transmission speed. The first transmission speed is faster than the second transmission speed, the third transmission speed, and the fourth transmission speed. The control module is used for detecting whether a USB peripheral device is connected to the USB 3.0 host, and controlling turning-on and turning-off of the super speed circuit.

6 Claims, 6 Drawing Sheets

(56) References Cited

U.S. PATENT DOCUMENTS

| | | | |
|---|---|---|---|
| 8,055,919 B2 | 11/2011 | Magnusson | |
| 8,073,985 B1 * | 12/2011 | Ni | G06F 12/1416 439/660 |
| 8,095,698 B2 * | 1/2012 | Santhanam | G06F 13/4081 710/15 |
| 8,719,475 B2 * | 5/2014 | Ma et al. | 710/110 |
| 2004/0153696 A1 * | 8/2004 | Govindaraman | G06F 1/3203 714/4.21 |
| 2006/0000917 A1 * | 1/2006 | Kim et al. | 235/492 |
| 2008/0046713 A1 * | 2/2008 | Barragy et al. | 713/100 |
| 2009/0006686 A1 * | 1/2009 | Kimura | G06F 13/4295 710/106 |
| 2009/0177819 A1 * | 7/2009 | Kang | 710/105 |
| 2009/0199022 A1 * | 8/2009 | Fukuda | G06F 1/3203 713/300 |
| 2009/0199031 A1 * | 8/2009 | Zhang et al. | 713/323 |
| 2009/0228730 A1 * | 9/2009 | Chin | G06F 1/32 713/324 |
| 2009/0228733 A1 * | 9/2009 | Wang | 713/500 |
| 2009/0300395 A1 * | 12/2009 | Chin | G06F 1/3215 713/324 |
| 2009/0307476 A1 * | 12/2009 | Khatri et al. | 713/2 |
| 2010/0005327 A1 * | 1/2010 | Murata | 713/320 |
| 2010/0042861 A1 | 2/2010 | Lee | |
| 2011/0131437 A1 * | 6/2011 | Shimazaki | 713/323 |
| 2011/0167177 A1 * | 7/2011 | Kouyama et al. | 710/11 |
| 2011/0179201 A1 * | 7/2011 | Monks | G06F 13/387 710/60 |
| 2012/0017101 A1 * | 1/2012 | So et al. | 713/300 |
| 2012/0059964 A1 * | 3/2012 | Foster | G06F 1/12 710/300 |
| 2012/0059965 A1 * | 3/2012 | Foster | 710/305 |
| 2012/0084594 A1 * | 4/2012 | Chen et al. | 713/501 |
| 2013/0246667 A1 * | 9/2013 | Markel | G06F 13/4081 710/15 |

FOREIGN PATENT DOCUMENTS

| | | |
|---|---|---|
| TW | 201035727 | 10/2010 |
| TW | 201117015 | 5/2011 |

* cited by examiner

UNIVERSAL SERIAL BUS (USB) 3.0 COMPATIBLE HOST WITH LOWER OPERATION POWER CONSUMPTION AND METHOD FOR REDUCING OPERATION POWER CONSUMPTION OF A USB 3.0 COMPATIBLE HOST

BACKGROUND OF THE INVENTION

1. Field of the Invention

The present invention is related to a USB 3.0 host with low power consumption and a method for reducing power consumption of a USB 3.0 host, and particularly to a USB 3.0 host with low power consumption and a method for reducing power consumption of a USB 3.0 host that can reduce power consumption by controlling turning-on and turning-off of a super speed circuit of the USB 3.0 host.

2. Description of the Prior Art

Please refer to FIG. 1A. FIG. 1A is a diagram illustrating a USB 3.0 host 100 connected to a USB 3.0 peripheral device 110 through a composite cable 120, and FIG. 1B is a diagram illustrating a USB 3.0 host 100 connected to a non-USB 3.0 peripheral device 130 through the composite cable 120. As shown in FIG. 1A, a physical layer of the USB 3.0 host 100 is divided into a super speed circuit 102 which supports super speed transmission (USB 3.0), and a non-super speed circuit 104 which supports non-super speed transmission (USB 2.0), where the non-super speed circuit 104 further includes a high speed circuit 1042, a full speed circuit 1044, and a low speed circuit 1046. Similarly, the USB 3.0 peripheral device 110 also has a super speed circuit 112 which supports the super speed transmission, and a non-super speed circuit 114 which supports the non-super speed transmission. The super speed circuit 102 of the USB 3.0 host 100 communicates with the super speed circuit 112 of the USB 3.0 peripheral device 110 through a first connection line 122 of a composite cable 120, and the non-super speed circuit 104 of the USB 3.0 host 100 communicates with the non-super speed circuit 114 of the USB 3.0 peripheral device 110 through a second connection line 124 of the composite cable 120. It should be noted that the super speed circuit 102 and the non-super speed circuit 104 of the USB 3.0 host 100 do not simultaneously communicate with the super speed circuit 112 and the non-super speed circuit 114 of the USB 3.0 peripheral device 110 through the first connection line 122 and the second connection line 124 of the composite cable 120, respectively. In addition, as shown in FIG. 1B, a non-USB 3.0 peripheral device 130 only has a non-super speed circuit 134 which supports the non-super speed transmission. Therefore, the non-super speed circuit 134 of the non-USB 3.0 peripheral device 130 only communicates with the non-super speed circuit 104 of the USB 3.0 host 100 through the second connection line 124 of the composite cable 120.

In the prior art, regardless of whether the USB 3.0 peripheral device 110 or the non-USB 3.0 peripheral device 130 is connected to the USB 3.0 host 100, the super speed circuit 102 of the USB 3.0 host 100 is always turned on. Thus, the USB 3.0 host 100 unnecessarily wastes much power consumption.

SUMMARY OF THE INVENTION

An embodiment provides a USB 3.0 host with low power consumption. The USB 3.0 host includes a super speed circuit, a non-super speed circuit, and a control module. The super speed circuit is used for transmitting data at a first transmission speed, where a default state of the super speed circuit is turned off. The non-super speed circuit is used for transmitting data at a second transmission speed, a third transmission speed, or a fourth transmission speed, where the first transmission speed is faster than the second transmission speed, the third transmission speed, and the fourth transmission speed. The control module is used for detecting whether a USB peripheral device is connected to the USB 3.0 host, and controlling turning-on and turning-off of the super speed circuit.

Another embodiment provides a method for reducing power consumption of a USB 3.0 host. The method includes turning off a super speed circuit of a USB 3.0 host; a control module turning on the super speed circuit of the USB 3.0 host when a USB peripheral device is connected to the USB 3.0 host; the control module transmitting a reset signal to the USB peripheral device; the USB peripheral device communicating with the USB 3.0 host according to the reset signal.

The present invention provides a USB 3.0 host with low power consumption and a method for reducing power consumption of a USB 3.0 host. The USB 3.0 host and the method preset a super speed circuit of the USB 3.0 host to be turned off. When a USB peripheral device (a USB 3.0 peripheral device or a non-USB 3.0 peripheral device) is connected to the USB 3.0 host, a control module turns on the super speed circuit of the USB 3.0 host. When the USB peripheral device connected to the USB 3.0 host is the non-USB 3.0 peripheral device, the control module turns off the super speed circuit of the USB 3.0 host again. Thus, in the present invention, the super speed circuit of the USB 3.0 host is not always turned on, so the USB 3.0 host can save much unnecessary power consumption.

These and other objectives of the present invention will no doubt become obvious to those of ordinary skill in the art after reading the following detailed description of the preferred embodiment that is illustrated in the various figures and drawings.

DETAILED DESCRIPTION

Figure 1A:
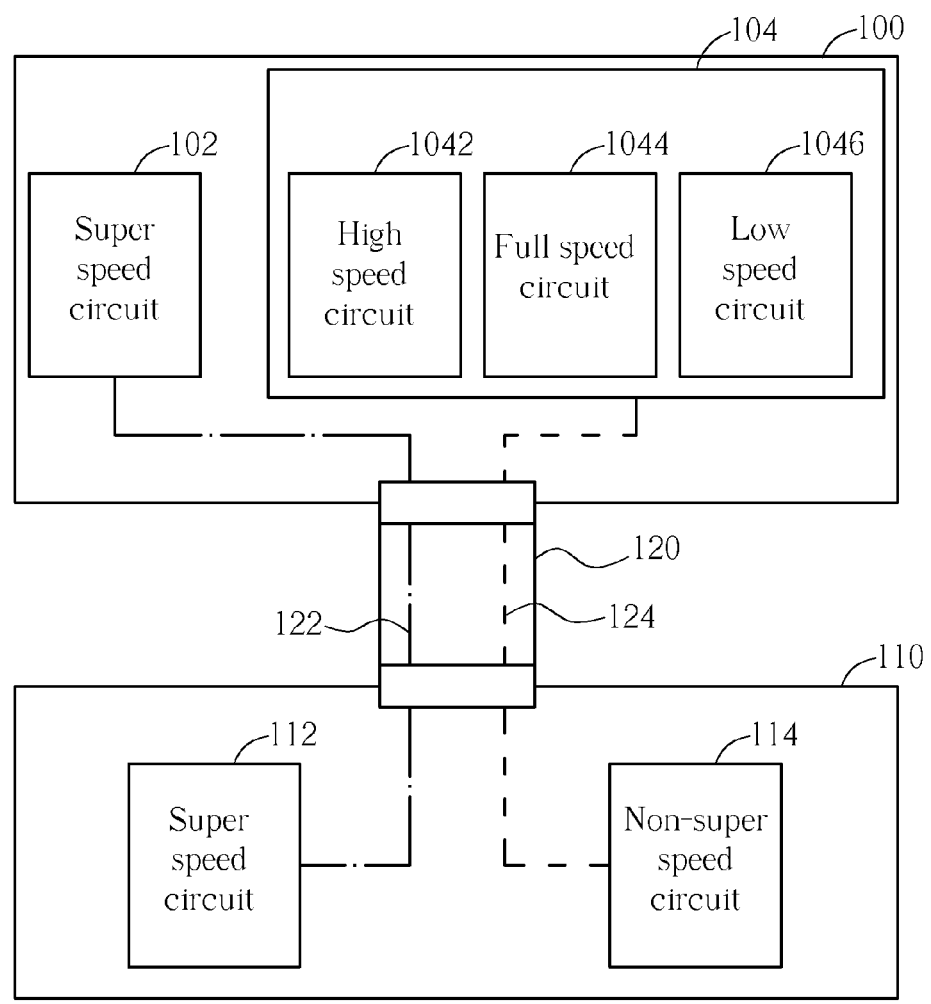
FIG. 1A is a diagram illustrating a USB 3.0 host being connected to a USB 3.0 peripheral device through a composite cable.
Figure 1B:
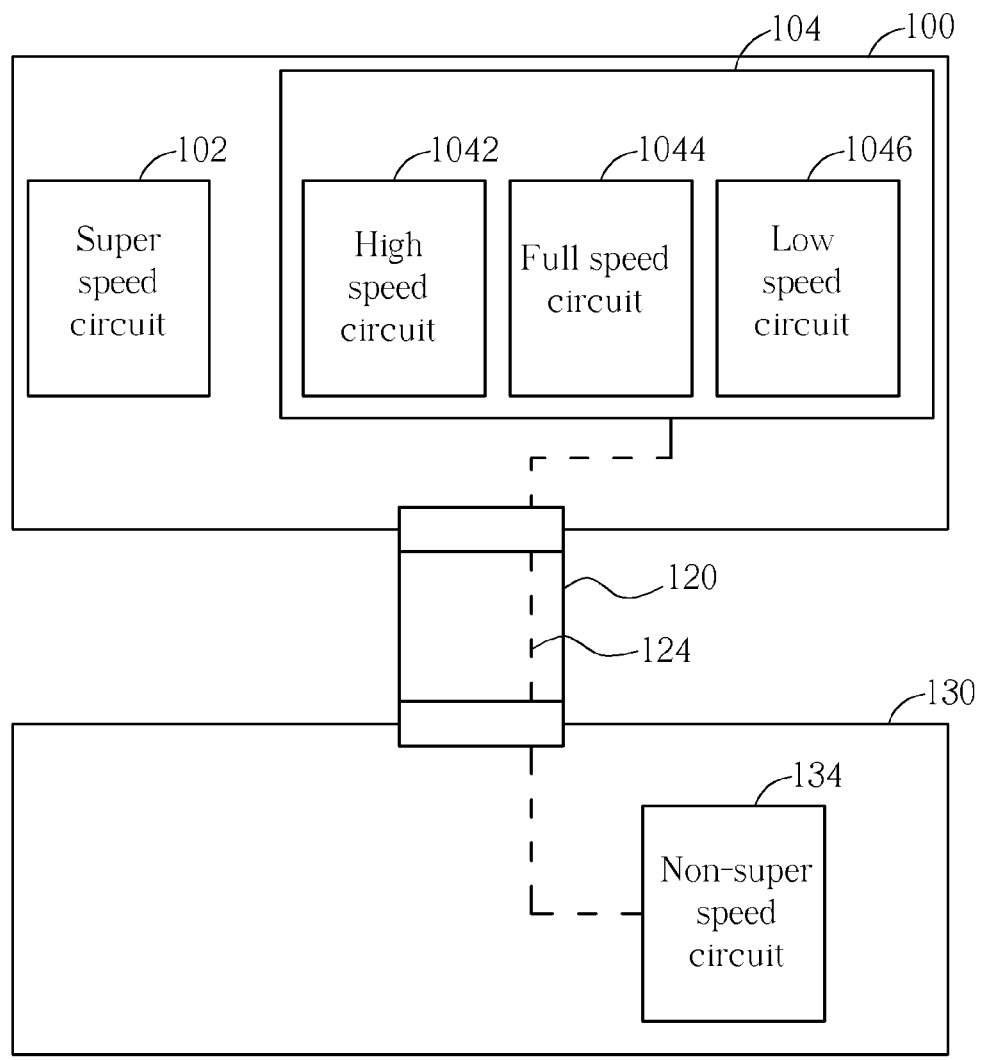
FIG. 1B is a diagram illustrating a USB 3.0 host being connected to a non-USB 3.0 peripheral device through the composite cable.
Figure 2:
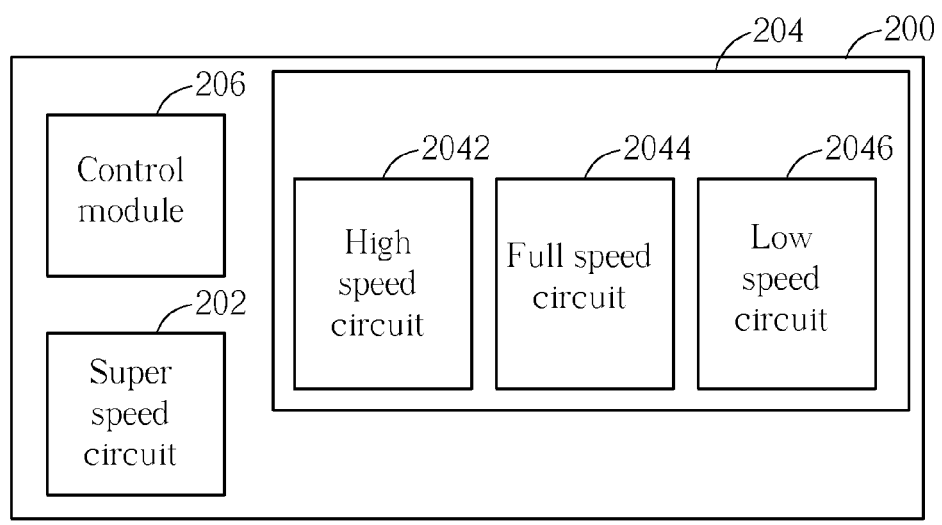
FIG. 2 is a diagram illustrating a USB 3.0 host with low power consumption according to an embodiment.

Please refer to FIG. 2. FIG. 2 is a diagram illustrating a USB 3.0 host 200 with low power consumption according to an embodiment. The USB 3.0 host 200 includes a super speed circuit 202, a non-super speed circuit 204, and a control module 206. The super speed circuit 202 is used for transmitting data at a first transmission speed, where a default state of the super speed circuit 202 is turned off. The non-super speed circuit 204 includes a high speed circuit 2042, a full speed circuit 2044, and a low speed circuit 2046, where the high speed circuit 2042 is used for transmitting data at a second transmission speed, the full speed circuit 2044 is used for transmitting data at a third transmission speed, the low speed circuit 2046 is used for transmitting data at a fourth transmission speed, and the first transmission speed is faster than the second transmission speed, the third transmission speed, and the fourth transmission speed. The control module 206 is used for detecting whether a USB peripheral device 208 is connected to the USB 3.0 host, and controlling turning-on and turning-off of the super speed circuit 202. The control module 206 may be implemented in hardware, software, firmware, or any combination thereof.

Figure 3A:
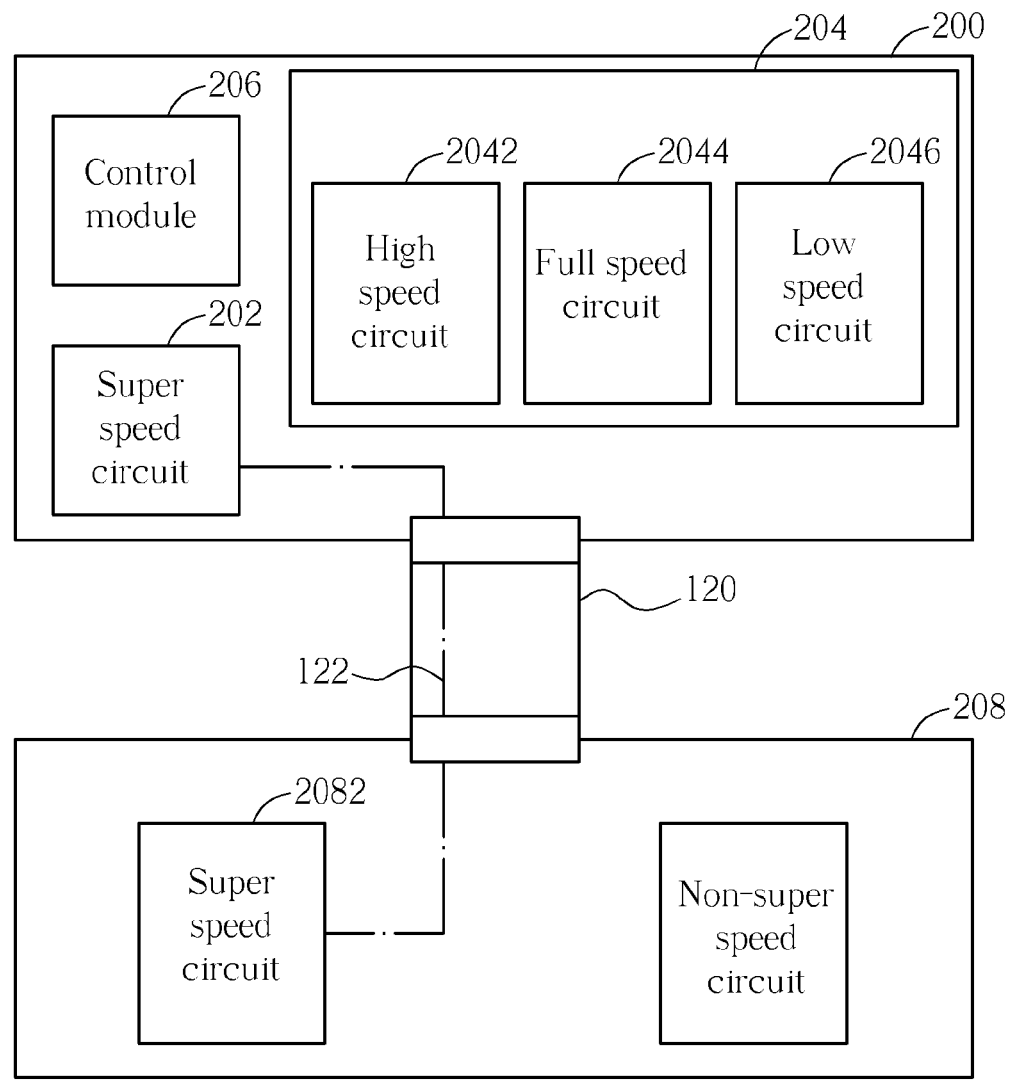
FIG. 3A is a diagram illustrating the control module detecting the USB 3.0 peripheral device is connected to the USB 3.0 host.
Figure 3B:
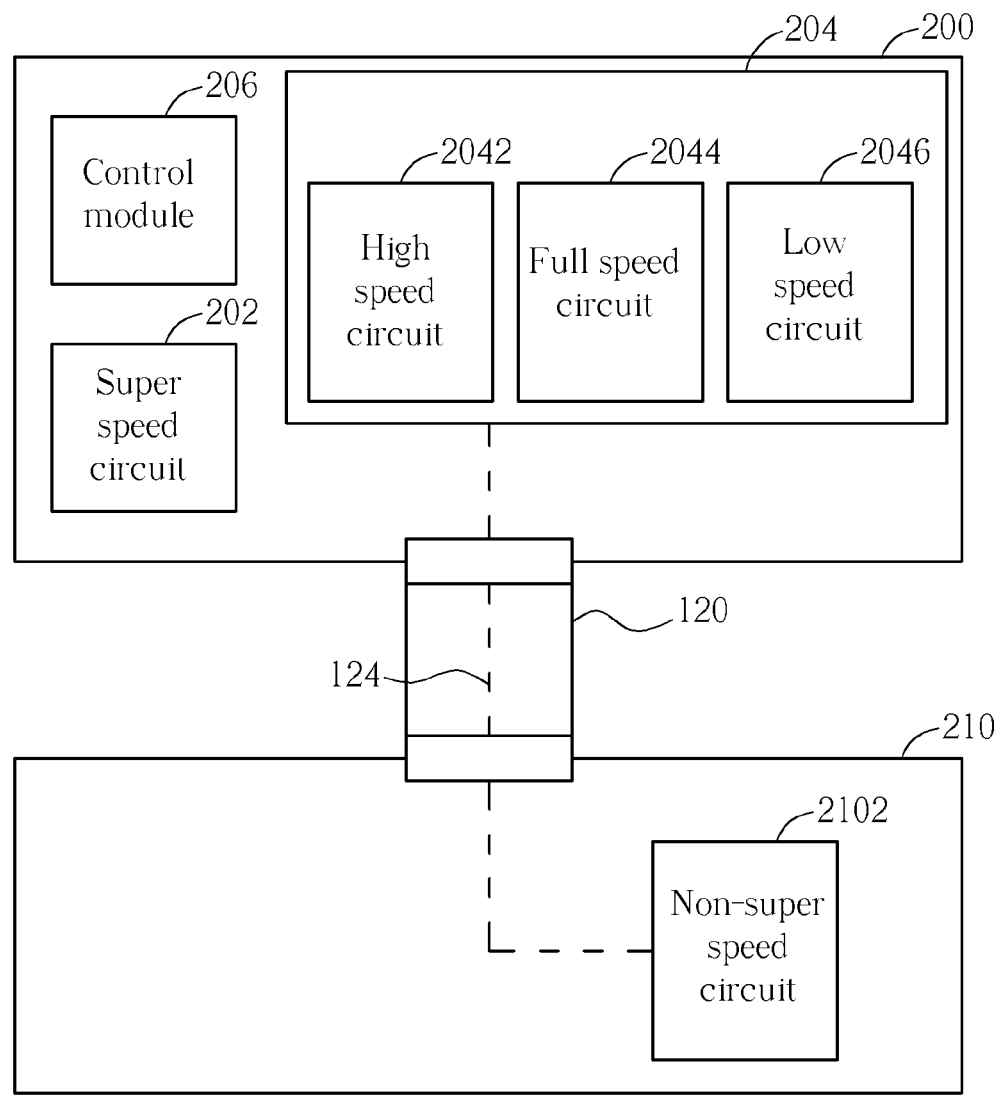
FIG. 3B is a diagram illustrating the control module detecting a non-USB 3.0 peripheral device is connected to the USB 3.0 host.

Please refer to FIG. 3A and FIG. 3B. FIG. 3A is a diagram illustrating the control module 206 detecting the USB 3.0 peripheral device 208 is connected to the USB 3.0 host 200, and FIG. 3B is a diagram illustrating the control module 206 detecting a non-USB 3.0 peripheral device 210 is connected to the USB 3.0 host 200. As shown in FIG. 3A, when the control module 206 detects that the USB 3.0 peripheral device 208 is connected to the USB 3.0 host 200, the control module 206 turns on the super speed circuit 202 and transmits a reset signal to the USB 3.0 peripheral device 208. After the USB 3.0 peripheral device 208 receives the reset signal, the USB 3.0 peripheral device 208 utilizes a super speed circuit 2082 included by the USB 3.0 peripheral device 208 to communicate with the super speed circuit 202 of the USB 3.0 host 200 through a first connection line 122 of a composite cable 120 according to the reset signal and a USB 3.0 specification. Meanwhile, because the non-super speed circuit 204 is not used, the control module 206 turns off the non-super speed circuit 204 of the USB 3.0 host 200 to save power. In addition, the control module 206 turns off the super speed circuit 202 of the USB 3.0 host 200 again when the USB 3.0 peripheral device 208 is unplugged from the USB 3.0 host 200.

As shown in FIG. 3B, when the control module 206 detects that the non-USB 3.0 peripheral device 210 is connected to the USB 3.0 host 200, the control module 206 turns on the super speed circuit 202 and transmits a reset signal to the non-USB 3.0 peripheral device 210. After the non-USB 3.0 peripheral device 210 receives the reset signal, the non-USB 3.0 peripheral device 210 utilizes a non-super speed circuit 2102 included by the non-USB 3.0 peripheral device 210 to communicate with the non-super speed circuit 204 of the USB 3.0 host 200 through a second connection line 124 of the composite cable 120 according to the reset signal and the USB 3.0 specification. Meanwhile, because the super speed circuit 202 is not used, the control module 206 turns off the super speed circuit 202 of the USB 3.0 host 200 again to save power.

Figure 4:
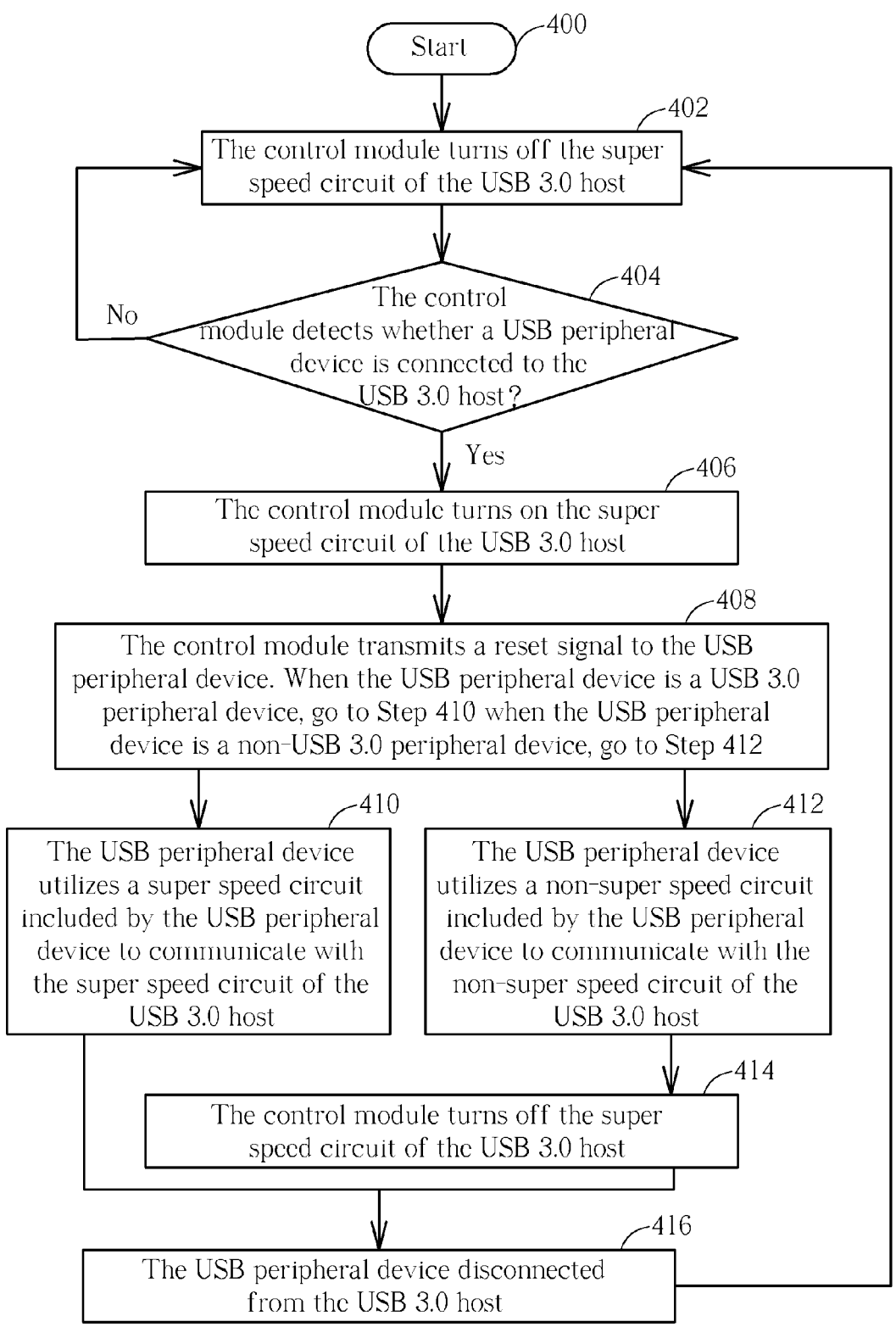
FIG. 4 is a flowchart illustrating a method for reducing power consumption of the USB 3.0 host 200 according to another embodiment.

Please refer to FIG. 4. FIG. 4 is a flowchart illustrating a method for reducing power consumption of the USB 3.0 host 200 according to another embodiment. Detailed steps are as follows:

Step 400: Start.

Step 402: The control module 206 turns off the super speed circuit 202 of the USB 3.0 host 200.

Step 404: The control module 206 detects whether a USB peripheral device is connected to the USB 3.0 host 200; if yes, go to Step 406; if no, go to Step 402.

Step 406: The control module 206 turns on the super speed circuit 202 of the USB 3.0 host 200.

Step 408: The control module 206 transmits a reset signal to the USB peripheral device. When the USB peripheral device is a USB 3.0 peripheral device, go to Step 410; when the USB peripheral device is a non-USB 3.0 peripheral device, go to Step 412.

Step 410: The USB peripheral device utilizes a super speed circuit included by the USB peripheral device to communicate with the super speed circuit 202 of the USB 3.0 host 200, go to Step 416.

Step 412: The USB peripheral device utilizes a non-super speed circuit included by the USB peripheral device to communicate with the non-super speed circuit 204 of the USB 3.0 host 200; go to Step 414.

Step 414: The control module 206 turns off the super speed circuit 202 of the USB 3.0 host 200; go to Step 416.

Step 416: The USB peripheral device disconnected from the USB 3.0 host 200; go to Step 402.

In Step 402, the default state of the super speed circuit 202 of the USB 3.0 host 200 is turned off. In Step 404, the control module 206 detects whether the USB peripheral device (the USB 3.0 peripheral device or the non-USB 3.0 peripheral device) is connected to the USB 3.0 host 200. In Step 406, when the control module 206 detects that a USB peripheral device is connected to the USB 3.0 host 200, the control module 206 turns on the super speed circuit 202 of the USB 3.0 host 200. In Step 410, as shown in FIG. 3A, the USB 3.0 peripheral device 208 utilizes the super speed circuit 2082 included by the USB 3.0 peripheral device 208 to communicate with the super speed circuit 202 of the USB 3.0 host 200 through the first connection line 122 of the composite cable 120 according to the reset signal and the USB 3.0 specification. Meanwhile, because the non-super speed circuit 204 is not used, the control module 206 turns off the non-super speed circuit 204 of the USB 3.0 host 200 to save power. In Step 412, as shown in FIG. 3B, the non-USB 3.0 peripheral device 210 utilizes the non-super speed circuit 2102 included by the non-USB 3.0 peripheral device 210 to communicate with the non-super speed circuit 204 of the USB 3.0 host 200 through the second connection line 124 of the composite cable 120 according to the reset signal and the USB 3.0 specification. In addition, in Step 414, because the super speed circuit 202 is not used, the control module 206 turns off the super speed circuit 202 of the USB 3.0 host 200 again to save power. In Step 416, the control module 206 turns off the super speed circuit 202 of the USB 3.0 host 200 again when the USB peripheral device is unplugged from the USB 3.0 host 200.

To sum up, the USB 3.0 host with low power consumption and the method for reducing power consumption of the USB 3.0 host preset the super speed circuit of the USB 3.0 host to be turned off. When a USB peripheral device (a USB 3.0 peripheral device or a non-USB 3.0 peripheral device) is connected to the USB 3.0 host, the control module turns on the super speed circuit of the USB 3.0 host. When the USB peripheral device connected to the USB 3.0 host is the non-USB 3.0 peripheral device, the control module turns off the super speed circuit of the USB 3.0 host again. Thus, in the present invention, the super speed circuit of the USB 3.0 host is not always turned on, so the USB 3.0 host can save much unnecessary power consumption.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A Universal Serial Bus (USB) 3.0 compatible host with lower operation power consumption, the USB 3.0 compatible host comprising:

a super speed circuit for transmitting data at a first transmission speed, wherein a default state of the super speed circuit is turned off when a USB compatible peripheral device is not yet connected to the USB 3.0 compatible host;

a non-super speed circuit for transmitting data at a second transmission speed, a third transmission speed, or a fourth transmission speed, wherein the first transmission speed is faster than the second transmission speed, the third transmission speed, and the fourth transmission speed;

a control circuit turning on the super speed circuit which exits the default state when the USB compatible peripheral device being connected to the USB 3.0 compatible host and transmitting a reset signal to the USB compatible peripheral device; and wherein the USB compatible peripheral device utilizes a non-super speed circuit included by the USB compatible peripheral device to communicate with the non-super speed circuit of the USB 3.0 compatible host according to the reset signal when the USB compatible peripheral device is the non-USB 3.0 peripheral device, and the control circuit turns off the super speed circuit of the USB 3.0 compatible host when the USB compatible peripheral device is the non-USB 3.0 peripheral device.

2. The USB 3.0 compatible host of claim 1, wherein the USB compatible peripheral device utilizes a super speed circuit included by the USB compatible peripheral device to communicate with the super speed circuit of the USB 3.0 compatible host according to the reset signal when the USB compatible peripheral device is the USB 3.0 compatible peripheral device.

3. The USB 3.0 compatible host of claim 2, wherein the control circuit turns off the non-super speed circuit of the USB 3.0 compatible host when the USB compatible peripheral device is the USB 3.0 compatible peripheral device.

4. A method for reducing operation power consumption of a USB 3.0 compatible host, the method comprising:

making a super speed circuit of a USB 3.0 compatible host enter a default state when a USB compatible peripheral device is not yet connected to the USB 3.0 compatible host, wherein the default state of the super speed circuit is turned off;

a control circuit turning on the super speed circuit of the USB 3.0 compatible host which exits the default state when a USB compatible peripheral device being connected to the USB 3.0 compatible host and transmitting a reset signal to the USB compatible peripheral device; and wherein the USB compatible peripheral device utilizes a super speed circuit included by the USB compatible peripheral device to communicate with the super speed circuit of the USB 3.0 compatible host according to the reset signal when the USB compatible peripheral device is the USB 3.0 compatible peripheral device;

wherein the USB compatible peripheral device utilizes a non-super speed circuit included by the USB compatible peripheral device to communicate with a non-super speed circuit of the USB 3.0 compatible host according to the reset signal when the USB compatible peripheral device is the non-USB 3.0 peripheral device, and the control circuit turns off the non-super speed circuit of the USB 3.0 compatible host when the USB compatible peripheral device is the USB 3.0 compatible peripheral device.

5. The method of claim 4, wherein the control circuit turns off the super speed circuit of the USB 3.0 compatible host when the USB compatible peripheral device is the non-USB 3.0 peripheral device.

6. The method of claim 4, further comprising:

the control circuit turning off the super speed circuit of the USB 3.0 compatible host again when the USB compatible peripheral device is disconnected from the USB 3.0 compatible host.

\* \* \* \* \*